United States Patent
Rykaer et al.

(10) Patent No.: US 6,290,849 B1
(45) Date of Patent: Sep. 18, 2001

(54) METHOD FOR BIOLOGICAL PURIFICATION OF WASTE WATER BY THE ACTIVATED SLUDGE METHOD AND APPARATUS FOR CARRYING OUT THE METHOD

(75) Inventors: Søren Rykaer, Birkerød; Gert Petersen, Dragør, both of (DK)

(73) Assignee: Kruger A/S, Søborg (DK)

( * ) Notice: Subject to any disclaimer, the term of this patent is extended or adjusted under 35 U.S.C. 154(b) by 0 days.

(21) Appl. No.: 09/462,192
(22) PCT Filed: Jul. 3, 1998
(86) PCT No.: PCT/DK98/00308
§ 371 Date: Apr. 4, 2000
§ 102(e) Date: Apr. 4, 2000
(87) PCT Pub. No.: WO99/01387
PCT Pub. Date: Jan. 14, 1999

(30) Foreign Application Priority Data

Jul. 4, 1997 (DK) .................................... 0803/97

(51) Int. Cl.⁷ ................. C02F 3/12; C02F 3/30
(52) U.S. Cl. ............ 210/605; 210/620; 210/630; 210/903
(58) Field of Search ................. 210/605, 620, 210/630, 903, 629

(56) References Cited

U.S. PATENT DOCUMENTS

| 3,964,998 | * | 6/1976 | Barnard . |
| 4,304,863 | | 12/1981 | Collins et al. . |
| 4,663,044 | * | 5/1987 | Goronszy . |
| 5,354,471 | * | 10/1994 | Timpany et al. . |

FOREIGN PATENT DOCUMENTS

| 131279 | 6/1975 | (DK) . |
| 0218289 | 4/1987 | (EP) . |
| 0363718 | 4/1990 | (EP) . |
| 9602468 | 2/1996 | (WO) . |

* cited by examiner

Primary Examiner—Chester T. Barry
Assistant Examiner—Fred Prince
(74) Attorney, Agent, or Firm—Dykema Gossett PLLC

(57) ABSTRACT

A method and an apparatus for biological purification of waste water by the activated sludge method, whereby the waste water is continuously passed through several treatment zones in which the waste water is successively subjected to nitrification and denitrification. The treatment zones are arranged circularly around a supply zone for waste water, whereby the supply zone is alternatingly connected with one of the treatment zones, and optionally a clarification zone for dividing the treated waste water into a water fraction and a sludge fraction.

10 Claims, 4 Drawing Sheets

METHOD FOR BIOLOGICAL PURIFICATION OF WASTE WATER BY THE ACTIVATED SLUDGE METHOD AND APPARATUS FOR CARRYING OUT THE METHOD

The present invention relates to a method for biological purification of waste water by the activated sludge method, wherein the waste water is continuously passed through at least two treatment zones in which the waste water is successively subjected to nitrification and denitrification, and an optional clarification zone for dividing the treated waste water into a water fraction and a sludge fraction, using an apparatus comprising four treatment zones (I, II, III, IV), wherein alternating anoxic and aerobic conditions and optionally sedimentation are established, said treatment zones being arranged around a central supply zone for waste water to be purified.

It is known to remove nitrogen from waste water by subjecting it to nitrification for conversion of ammonia into nitrate, and to denitrification for conversion of nitrate into free nitrogen, optionally supplemented with an anaerobic treatment for removal of phosphorous.

Danish patent No. 131 297 discloses a method for biological removal of nitrogen (the biodenitro method), whereby the waste water is passed through two treatment zones under alternating anoxic and aerobic conditions so as to obtain suitable nitrogen removal. If supplemented with an anaerobic zone, an additional reduction of the phosphorous content is obtained (the biodenipho method).

This method has been further developed to comprise three treatment zones (triple channel), where the waste water is passed through a denitrification zone and then through one or two nitrification zones, waste water being in periods passed through two of the three zones. This means that the content of ammonia and nitrate in the waste water is reduced as compared with treatment in two zones.

This method can also be combined with an anaerobic treatment zone for reducing the phosphorous content in the waste water.

There are, however, still some concentration fluctuations in the effluent from the last treatment zone which it would be desirable to even out in order to achieve a more homogeneous effluent quality.

Consequently, it has been considered to increase the number of treatment zones to four so as to obtain improved flexibility. The triple channel system is, however, usually carried out in a plant consisting of three successive tanks, which as compared with the denitro method, which usually is carried out in only two tanks, is more expensive, and an extension so as to comprise four separate tanks will only make the initial costs even higher, for which reason this is of no commercial interest.

An example of a system comprising four tanks is disclosed in WO 96/02468. Since this system is designed specifically for operating with sedimentation, with inlet of waste water into only two of the four tanks, combined with outlet from the two other tanks, the method described is not very flexible.

EP 218 289 describes a method using a tank comprising four compartments operated in a way, where the inlet is shifted from compartment to compartment in a circular pattern, always with an outlet opposite to the inlet. In this way the waste water is always passed through 3 compartments and is subjected to simultaneous nitrification and denitrification. By using this prior art method and apparatus, a fully satisfactory removal of nitrate cannot be obtained.

It has now surprisingly turned out that by the method according to the invention an effective purification of the waste water is obtainable using a commercially acceptable plant.

The method according to the invention is characterized in that only two treatment zones (I, IV) are provided with means for discharging treated water, that the untreated waste water from the central supply zone alternatingly is passed into a first of the four treatment zones (I, II, III or IV), operated under anoxic conditions, and following an optional treatment in one or two additional treatment zones (II and/or III) is passed into a last treatment zone (I, IV) from which treated waste water is discharged.

Naming the four zones I, II, III and IV is merely to demonstrate that untreated waste water can be supplied to any of the particular treatment zones, and that treated waste can be discharged only from two of the four treatment zones. This arrangement establishes basis for various types of operation which can be used according to need, since the waste water optionally can be passed through two or more treatment zones, comprising anoxic and/or aerobic treatment. This flexibility ensures that the time during which the waste water is subjected to either nitrification or denitrification can be adjusted according to the composition of the waste water to be treated.

By operating one of the compartments as a sedimentation zone, it is possible to increase the capacity of the system, which can be useful at times with e.g. heavy raining.

By this method an effective removal of nitrogen from the waste water is obtained, and the abovementioned concentration fluctuations in the effluent from the tank are significantly reduced. At the same time improved exploitation of carbon is achieved, as the waste water is always supplied to an anoxic phase. Thus, a better adaptation to the load and the BOD/N ratio of the waste water is made possible.

The method according to the invention may be carried out in an apparatus comprising a tank which by means of partition walls is divided into at least four compartments positioned around supply means for central supply of waste water, and with means for alternatingly connecting the supply means with each of the four compartments, and means for removal of treated waste water from two compartments.

In the following the invention will be described in more detail with reference to the drawings, where:

Figure 1:
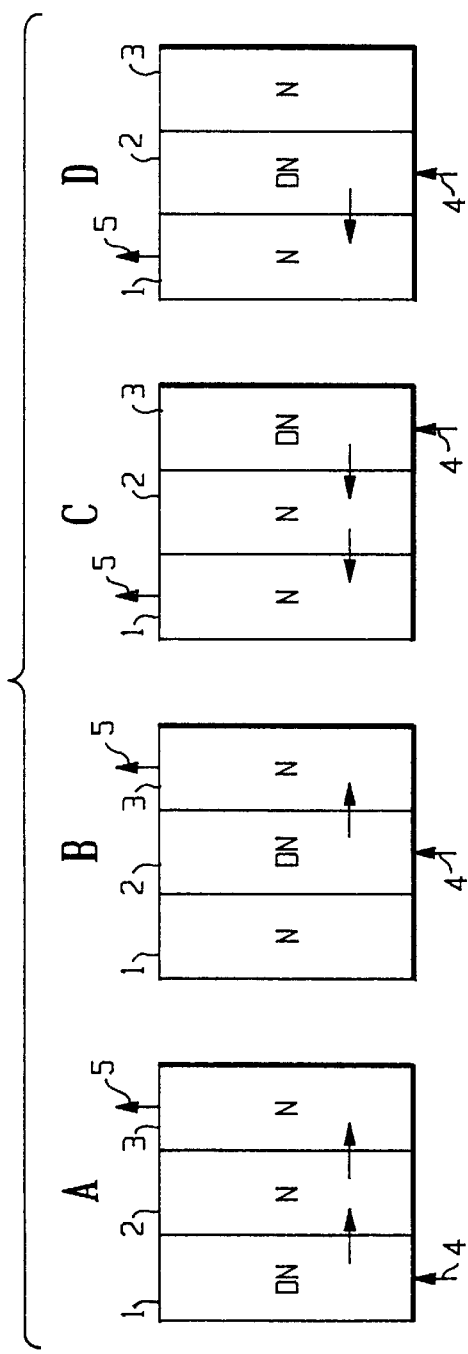
FIG. 1 is a flow chart which illustrates a known (triple channel) method for purification of waste water.

FIG. 1 illustrates the flow according to a conventional triple channel solution. Here, in a first phase A, the waste water is, via an inlet (4), passed into a zone, in which there are established conditions for maintaining a denitrification zone, further on to a zone (2), in which there are established conditions for maintaining a denitrification zone succeeded by yet a zone (3) with nitrification, whereafter it is discharged through an outlet (5). In a second phase B, the inlet (4) is moved so that the waste water is passed to the zone (2) in which denitrification now takes place, then to the zone (3) with nitrification, and from there further out through the outlet (5). In a third phase C, the inlet (4) is moved to the zone (3) now serving as denitrification zone. From here the waste water is passed to the zone (2) with nitrification, and further on to zone (1), also with nitrification. In a last phase D, the inlet (4) for the waste water is moved back again to the zone (2), which is denitrification zone, whereafter the waste water is passed to the zone (1) with nitrification.

The method described above has, however, only three treatment zones to alternate between, which is usually an excellent solution. However, there are still considerable fluctuations in the concentration of ammonia and nitrate in the effluent.

Figure 2:
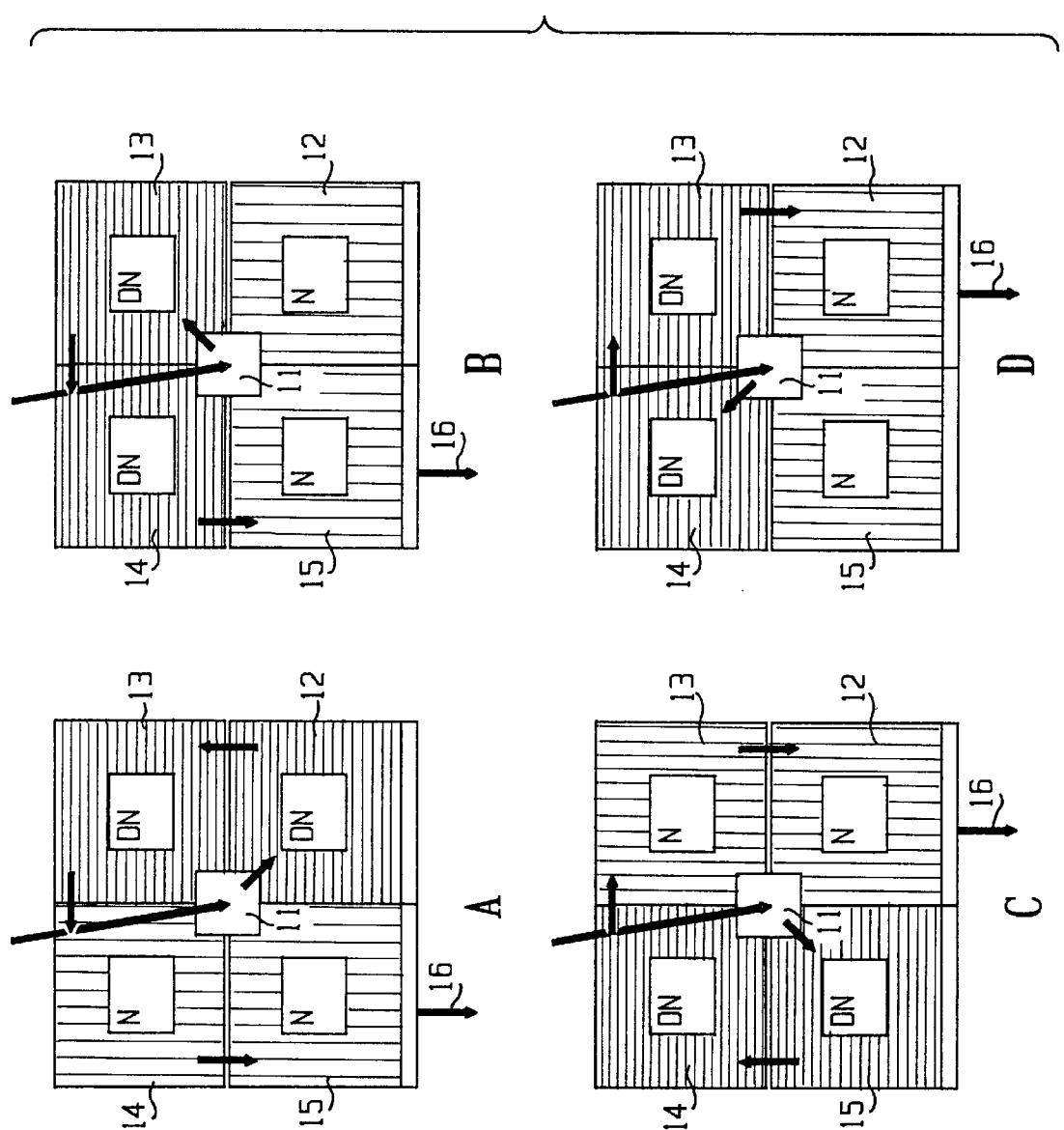
FIG. 2 is a flow chart which illustrates an embodiment of the method according to the invention for use in normal operation.

FIG. 2 illustrates schematically an embodiment of the method according to the invention. In that connection is should be mentioned that although the zones here appear as square areas, this does not mean that the actual compartments have this form in practice.

In a first phase A, the waste water is passed to a first denitrification zone (12) via a supply zone (11), further on to an additional denitrification zone (13), and from there to a nitrification zone (14), from there to an additional nitrification zone (15), from where it is discharged via an outlet (16).

In a second phase B, the waste water is, via the supply zone (11), passed to the zone which was formerly the second denitrification zone (13). From here it is passed on to a second denitrification zone (14), which was formerly the first nitrification zone, and further on to a nitrification zone (15), from where it is withdrawn. In this phase, the zone (12), into which the waste water in the previous phase was introduced, is nitrification zone without throughflow.

In a third phase C, the supply zone is connected with the zone (15), which was formerly the last treatment zone, so that the direction of flow is now reversed. The situation is now analogous with phase A with two denitrification zones (15) and (14), and two nitrification zones (13) and (12).

In a fourth phase D, the supply zone is, analogously with phase B, connected with the zone which was formerly the second denitrification zone (14), so as to provide a situation similar to phase B, however, with reversed direction of flow.

As the apparatus for carrying out the method according to the invention, as mentioned above, has high flexibility, there are several possibilities of operating the plant, and in the following yet another embodiment will be illustrated.

Figure 3:
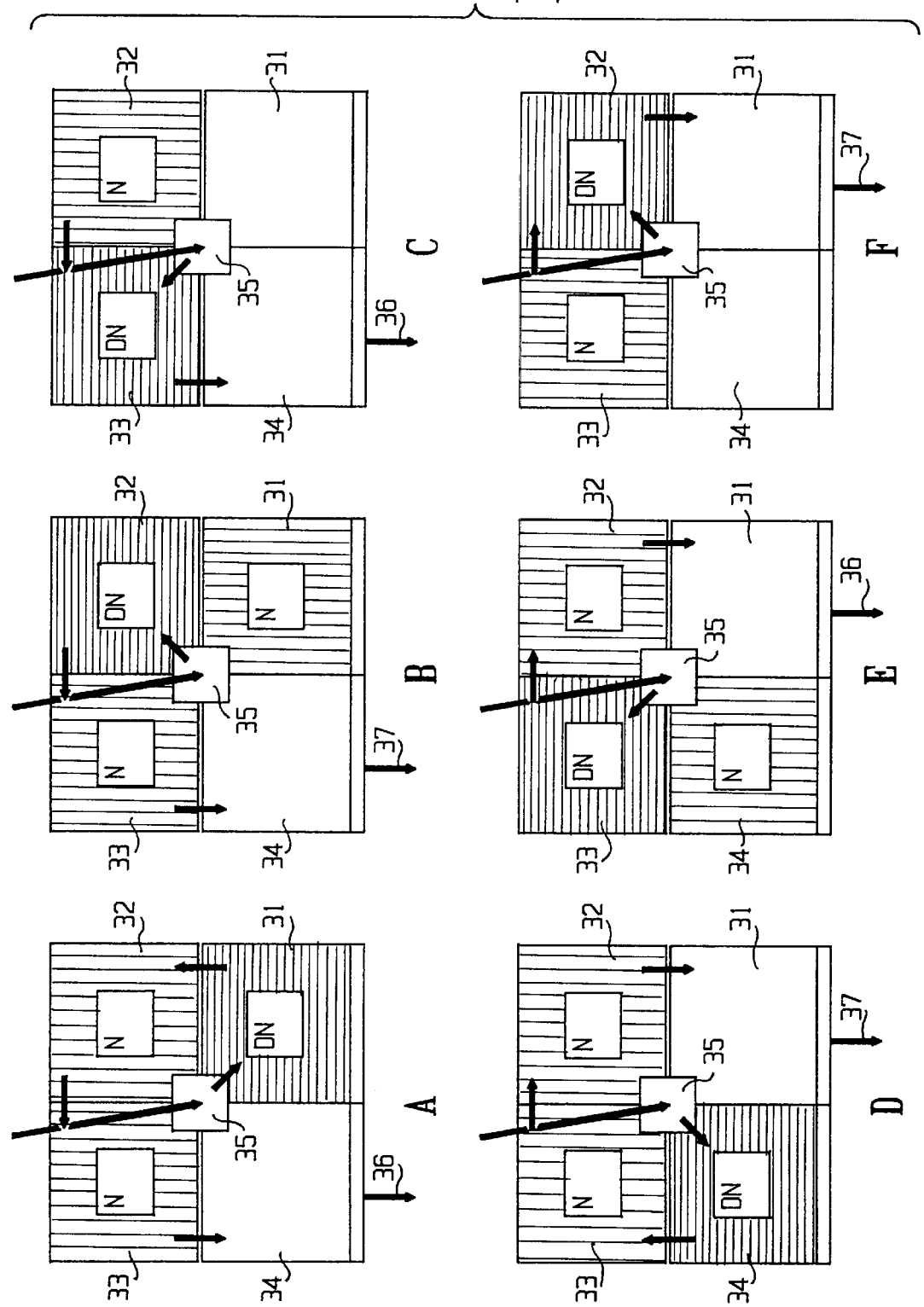
FIG. 3 is a flow chart which illustrates an embodiment of the method according to the invention for use in modified operation with internal clarification.

FIG. 3 illustrates an embodiment of the method according to the invention which comprises an internal clarification.

In a first phase A, the waste water is, via a supply zone (35), passed to a zone (31) with denitrification, further on to a zone (32) with nitrification, from there to a zone (33) with nitrification, and finally to a zone (34) in which an internal clarification is performed prior to the waste water leaving the tanks through an outlet (36).

In a second phase B, the waste water is, via the supply zone (35), passed to zone (32) with denitrification, bypassing zone (31) which is now nitrification zone without throughflow, further on to zone (33) with nitrification, and finally to zone (34) with internal clarification, prior to the waste water leaving the tank via the outlet (36).

In a third phase C, the waste water is passed into zone (33), which is now denitrification zone, and further to zone (34), which is clarification zone. Zone (32) is now denitrification zone without throughflow, and the aeration in zone (31), also without throughflow, has been stopped so that this zone is ready for use as clarification zone in a phase D.

In phase D, the waste water is passed the opposite way so that it is introduced into zone (34), which is now denitrification zone, further on to zone (33), with nitrification, from there to zone (32), also with nitrification, and finally to zone (31), in which clarification is now performed prior to the waste water leaving the tank through the outlet (37).

In the phases E and F, changes are made as described above under phases B and C so that zone (34) is first nitrification zone without throughflow, and is then prepared for clarification, and zone (32) is first nitrification zone and then denitrification zone.

Figure 6:
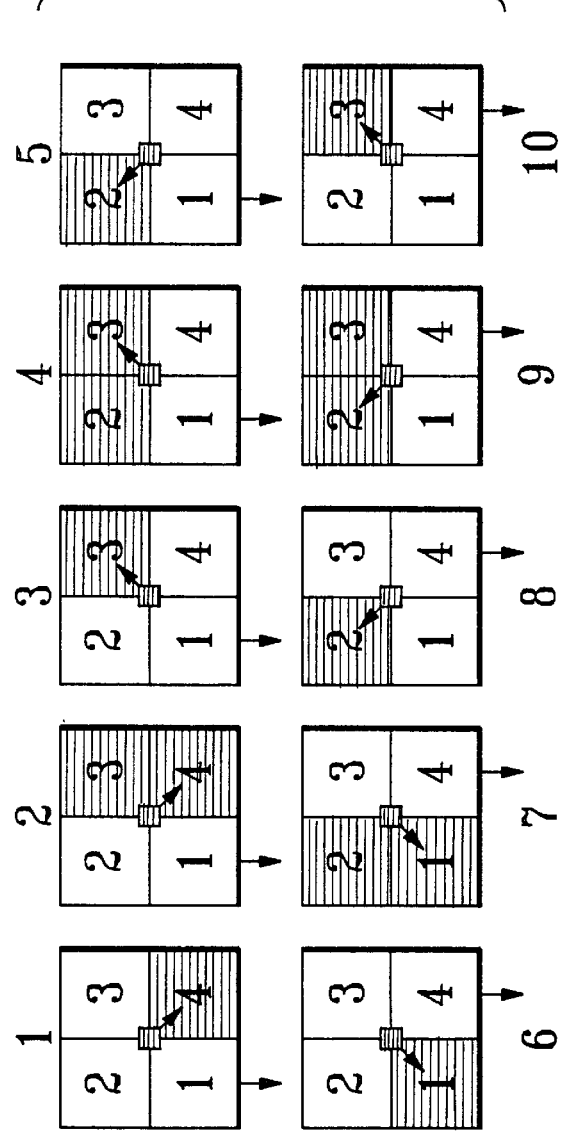
FIG. 6 illustrates suitable treatment patterns according to the invention.

FIG. 6 illustrates the treatment patterns of 10 different phases that can be combined according to the invention. The dark areas represent denitrification and the lighter areas nitrification. By combining typically 4–8 of these phases, a very flexible and efficient method for purification of waste water is obtained. Depending of the C/N ratio of the waste water, cycles of various phases are selected, e.g.

waste water wherein C/N>5 is treated in a cycle consisting of the phases 1,3,5 and 6,8,10;

waste water wherein 4<C/N<5 is treated in a cycle consisting of the phases 2,3,4 and 7,8,9,;

waste water wherein C/N<4 is treated in a cycle consisting of the phases 2,4 and 7,8.

Figure 4:
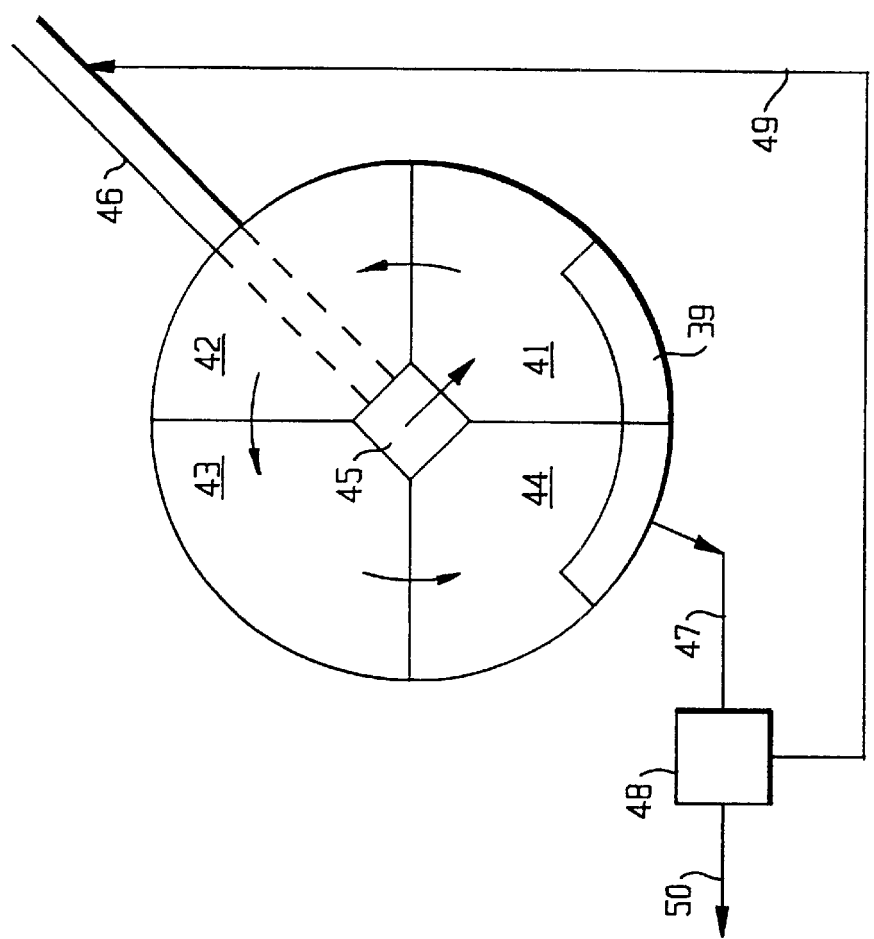
FIG. 4 illustrates an apparatus for carrying out the method according to the invention.

FIG. 4 illustrates an embodiment of an apparatus for carrying out the method according to the invention. The apparatus comprises an inlet (46) to central supply means (45) from where the waste water can be passed to any one of the four compartments (41), (42), (43) and (44). The compartments (41) and (44) are provided with a common overflow (39) for withdrawing treated waste water. This overflow is connected with a pipe (47) which leads to a clarification tank (48) with a recirculation pipe (49) and an outlet (50).

The arrows in the figure show the direction of flow for the waste water, provided it is passed into compartment (41). As with this construction it is possible alternatingly to connect the inlet for waste water and recirculation sludge with one or more of the compartments, this, as it is, is only an illustrative example. If supply is made to one of the other tanks, or if the direction of flow has been reversed, it is also possible to move the effluent to tank (41).

Figure 5:
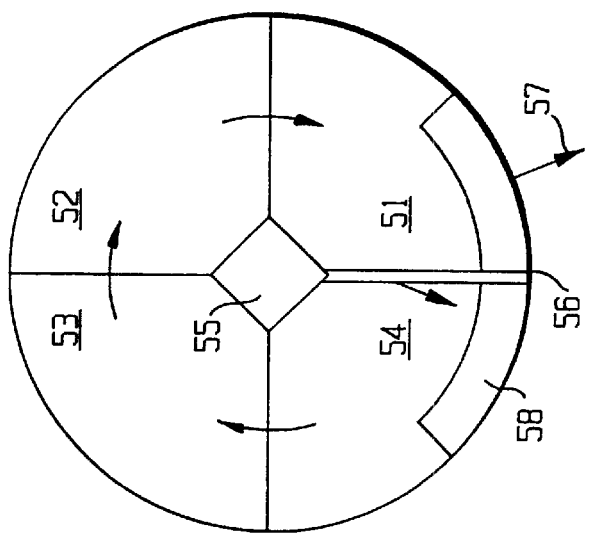
FIG. 5 illustrates an additional embodiment of an apparatus for carrying out the method according to the invention.

FIG. 5 illustrates an additional embodiment of an apparatus for carrying out the method according to the invention. The apparatus comprises an inlet (56) to central supply means (55) from where the waste water can be passed to any one of the four compartments (51), (52), (53), and (54). The compartments (51) and (54) are provided with a common overflow (58) for withdrawing treated waste water. This overflow is connected with an outlet (47) for withdrawing treated waste water.

Because of the location of the inlet it is possible in this embodiment to supply waste water to the compartments (51) and (54) by disposing devices for transfer of waste water at a given site between the periphery of the tank and the central supply means.

What is claimed is:

1. A method for biological purification of waste water by an activated sludge method, wherein the waste water is continuously passed through at least two treatment zones in which the waste water is successively subjected to nitrification and denitrification, and an optional clarification zone for dividing the treated waste water into a water fraction and a sludge fraction, using an apparatus comprising four treatment zones I, II, III, IV, wherein alternating anoxic and aerobic conditions and optionally sedimentation are established, said treatment zones being arranged around a central supply zone for waste water to be purified wherein only two treatment zones I, IV are provided with means for discharging treated water, untreated waste water from the central supply zone is alternatingly passed into a first of the four treatment zones I, II, III, IV, operated under anoxic conditions, and following an optional treatment in one or two additional treatment zones II and/or III, is passed into a last treatment zone I, IV from which treated waste water is discharged.

2. A method according to claim 1, wherein the waste water in a first period alternatingly is introduced into zone I, zone II or zone III and discharged from zone IV, and a in second period alternatingly is introduced into zone IV, zone III or zone II and discharged from zone I.

3. A method according to claim 1, wherein the waste water from the anoxic treatment zone is then passed directly to a zone in which aerobic conditions are maintained.

4. A method according to claim 3, wherein the waste water, prior to being passed to the aerobic treatment zone, is passed through an additional anoxic zone.

5. A method according to claim 1, wherein conditions for obtaining sedimentation are maintained in at least one zone.

6. A method according to claim 1, wherein the waste water withdrawn from the last treatment zone is passed to a clarification zone for dividing the waste water into a water fraction and a sludge fraction, and at least part of the sludge is recirculated to the supply zone.

7. A method according to claim 1, wherein in a second phase the waste water is supplied to the zone which in a preceding first phase was sedimentation zone.

8. A method according to claim 1, wherein in a first period the waste water is passed through four treatment zones comprising denitrification and nitrification, and in a second period bypasses at least one of the four treatment zones.

9. A method according to claim 1, wherein in a first period the waste water is passed through four treatment zones comprising denitrification, nitrification, and clarification, and in a second period bypasses at least one of the four treatment zones.

10. A method for biological purification of waste water by an activated sludge method, wherein the waste water is continuously passed through at least two treatment zones in which the waste water is successively subjected to nitrification and denitrification, and an optional clarification zone for dividing the treated waste water into a water fraction and a sludge fraction, using an apparatus comprising treatment zone I, treatment zone II, treatment zone III, and treatment zone IV, wherein alternating anoxic and aerobic conditions and optionally sedimentation are established, said treatment zones being arranged around a central supply zone for waste water to be purified wherein only said treatment zone I and treatment zone IV are provided with means for discharging treated water, untreated waste water from the central supply zone is alternatingly passed into a first of said treatment zone I, treatment zone II, treatment zone III and treatment zone IV, operated under anoxic conditions, and following an optional treatment in one or two of additional treatment zone II and/or treatment zone III, is passed into one of treatment zone I and treatment zone IV from which treated waste water is discharged.

* * * * *